United States Patent
Umeyama et al.

(10) Patent No.: US 9,509,911 B2
(45) Date of Patent: Nov. 29, 2016

(54) IMAGE-CAPTURING DEVICE, AND IMAGE COMBINATION PROGRAM

(75) Inventors: Kazuya Umeyama, Tokyo (JP); Tomotaka Shinoda, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 593 days.

(21) Appl. No.: 13/181,865

(22) Filed: Jul. 13, 2011

(65) Prior Publication Data

US 2012/0013737 A1 Jan. 19, 2012

(30) Foreign Application Priority Data

Jul. 14, 2010 (JP) .................................. 2010-159541
Jul. 14, 2010 (JP) .................................. 2010-159542

(51) Int. Cl.
H04N 5/232 (2006.01)
H04N 5/235 (2006.01)

(52) U.S. Cl.
CPC .......... *H04N 5/23254* (2013.01); *H04N 5/235* (2013.01)

(58) Field of Classification Search
None
See application file for complete search history.

(56) References Cited

U.S. PATENT DOCUMENTS

| 6,530,055 B1* | 3/2003 | Fukunaga ..................... 714/746 |
| 2001/0008418 A1* | 7/2001 | Yamanaka et al. ........... 348/222 |
| 2007/0206678 A1* | 9/2007 | Kondo ..................... 375/240.17 |
| 2007/0212044 A1 | 9/2007 | Yamasaki |
| 2008/0170124 A1* | 7/2008 | Hatanaka et al. ......... 348/208.4 |
| 2009/0225174 A1* | 9/2009 | Handa et al. .............. 348/208.3 |
| 2010/0171840 A1* | 7/2010 | Yonekura ................... 348/208.4 |

FOREIGN PATENT DOCUMENTS

| JP | A-2001-86398 | 3/2001 |
| JP | A 2008-124625 | 5/2008 |

OTHER PUBLICATIONS

Jan. 7, 2014 Office Action issued in Japanese Patent Application No. 2010-159542 (with translation).
Mar. 24, 2016 Office Action issued in Chinese Patent Application No. 201110204654.2.
Jun. 3, 2015 Office Action issued in Chinese Patent Application No. 201110204654.2.
Sep. 2, 2016 Office Action issued in Chinese Patent Application No. 201110204654.2.

* cited by examiner

Primary Examiner — Geepy Pe
(74) Attorney, Agent, or Firm — Oliff PLC

(57) ABSTRACT

An image-capturing device includes: an image-capturing unit that captures an image of a photographic subject; a selection unit that selects, as a reference image, a single image from among a plurality of images that have been captured in succession by the image-capturing unit; a calculation unit that calculates an amount of positional deviation between the reference image and each of the plurality of images other than the reference image; and a generation unit that generates a combined image by positionally aligning and then combining the reference image and those ones of the plurality of images whose amounts of positional deviation are less than or equal to a predetermined amount of deviation. The selection unit selects the reference image so that the number of images for which the amount of positional deviation is less than or equal to the predetermined amount of deviation becomes large.

10 Claims, 7 Drawing Sheets

IMAGE-CAPTURING DEVICE, AND IMAGE COMBINATION PROGRAM

INCORPORATION BY REFERENCE

The disclosures of the following priority applications are herein incorporated by reference: Japanese Patent Application No. 2010-159541 and Japanese Patent Application No. 2010-159542 both filed Jul. 14, 2010.

BACKGROUND OF THE INVENTION

1. Field of the Invention

The present invention relates to an image-capturing device and to an image combination program.

2. Description of Related Art

A technique is per se known of performing photography by dividing it into a plurality of successive exposures, and of then obtaining a single image by combining the image signals obtained each time (refer to Japanese Laid-Open Patent Publication No. 2001-86398).

However, with this prior art technique, if the amounts of positional deviation between the successively captured images are too great, then it is not possible to match the positions between the images, so that it is not possible to combine the images. Due to this, it has been considered to select one of the images as a reference image and eliminate from the subjects for combination those images whose positions cannot be matched to this reference image, while using other ones of the images instead of those eliminated images. However in this case there is the possibility that, if the image used for reference is not appropriately selected, then the number of images that are eliminated from the subjects for combination may become large, and this is undesirable.

Moreover, there is also the problem that the result of using the same image for combination several times will be that, in the combined image, the gain component of some particular one of the constituent images may become too great, and this is also undesirable.

SUMMARY OF THE INVENTION

An image-capturing device according to a 1st aspect of the present invention includes: an image-capturing unit that acquires an image by capturing an image of a photographic subject; a selection unit that selects, as a reference image, a single image from among a plurality of images that have been captured in succession by the image-capturing unit; a calculation unit that calculates an amount of positional deviation between the reference image selected by the selection unit and each of the plurality of images other than the reference image captured in succession by the image-capturing unit; and a generation unit that generates a combined image by positionally aligning and then combining the reference image and those ones of the plurality of images whose amounts of positional deviation calculated by the calculation unit are less than or equal to a predetermined amount of deviation. In this image-capturing device, it is preferred that the selection unit selects the reference image so that the number of images for which the amount of positional deviation is less than or equal to the predetermined amount of deviation becomes large.

According to a 2nd aspect of the present invention, in the image-capturing device of the 1st aspect, the selection unit can select the reference image from among the plurality of images captured in succession by the image-capturing unit, after having excluded the image that was captured first and the image that was captured last from the plurality of images.

According to a 3rd aspect of the present invention, in the image-capturing device of the 2nd aspect, it is preferred that if the number of the plurality of images captured in succession by the image-capturing unit is an odd number, the selection unit selects a single image positioned at the center when the plurality of images are arranged in time series as the reference image; and if the number of the plurality of images captured in succession by the image-capturing unit is an even number, the selection unit selects either one of two images positioned at the center when the plurality of images are arranged in time series as the reference image.

According to a 4th aspect of the present invention, in the image-capturing device of the 3rd aspect, if the number of the plurality of images captured in succession by the image-capturing unit is an even number, the selection unit may select, as the reference image, that one which was captured later of the two images positioned at the center when the plurality of images are arranged in time series.

According to a 5th aspect of the present invention, in the image-capturing device of the 1st aspect, the selection unit can select, from among the plurality of images captured in succession by the image-capturing unit, an image whose maximum amount of deviation from other images is the smallest as the reference image.

According to a 6th aspect of the present invention, in the image-capturing device of the 5th aspect, if shaking is present in the selected reference image, it is preferred that the selection unit selects an image whose maximum amount of deviation from other images is the second smallest as a substitutional reference image.

According to a 7th aspect of the present invention, in the image-capturing device of any one of the 1st through 5th aspects, it is preferred that the images that are captured by the image-capturing unit are images upon which hand shaking correction has been performed.

An image-capturing device according to an 8th aspect of the present invention, which combines a plurality of images and obtains an image having an appropriate exposure determined according to a situation during image capture, includes: an image-capturing unit that acquires an image by capturing an image of a photographic subject; a selection unit that selects, as a reference image, a single image from among a plurality of images that have been captured in succession by the image-capturing unit; a calculation unit that calculates an amount of positional deviation between the reference image selected by the selection unit and each of the plurality of images other than the reference image captured in succession by the image-capturing unit; a generation unit that generates a combined image by positionally aligning and then combining the reference image and subject images that are ones of the plurality of images and whose amounts of positional deviation calculated by the calculation unit are less than or equal to a predetermined amount of deviation; and a processing execution unit that, if the image having the appropriate exposure cannot be obtained by combination of the reference image and the subject images, executes processing for exposure correction upon the combined image with varying the processing according to the total number of the reference image and the subject images combined by the generation unit.

According to a 9th aspect of the present invention, in the image-capturing device of the 8th aspect, it is preferred that, on the basis of the number of the plurality of images captured in succession by the image-capturing unit and the number of the subject images that have been used for combination, the processing execution unit executes the processing for exposure correction upon the combined image so as to make an exposure of the combined image and an exposure of the image that would be obtained by combining all of the plurality of images agree with one another.

According to a 10th aspect of the present invention, in the image-capturing device of the 9th aspect, the processing execution unit may apply digital gain to the combined image according to the number of the subject images so as to make the exposure of the combined image and the exposure of the image that would be obtained by combining all of the plurality of images agree with one another According to an 11th aspect of the present invention, in the image-capturing device of the 9th aspect, the processing execution unit may perform additive combination of a certain number of copies of the combined image corresponding to the number of the subject images, while shifting them in mutually different directions by a predetermined amount so as to make the exposure of the combined image and the exposure of the image that would be obtained by combining all of the plurality of images agree with one another.

According to a 12th aspect of the present invention, in the image-capturing device of the 9th aspect, it is preferred that, on the basis of the number of the plurality of images captured in succession by the image-capturing unit and the number of the subject images that have been used for combination, the processing execution unit calculates a gain amount required in order to make the exposure of the combined image and the exposure of the image that would be obtained by combining all of the plurality of images agree with one another, if the required gain amount is less than or equal to a predetermined gain amount, the processing execution unit applies digital gain to the combined image according to the number of the subject images; and if the required gain amount is greater than the predetermined gain amount, the processing execution unit performs additive combination of a certain number of copies of the combined image corresponding to the number of the subject images, while shifting them in mutually different directions by a predetermined amount.

An image combination program according to a 13th aspect of the present invention causes a computer to execute: an image-capturing step of acquiring images of a photographic subject captured in succession; a selection step of selecting, as a reference image, a single image from among a plurality of images that have been captured in succession in the image-capturing step; a calculation step of calculating an amount of positional deviation between the reference image selected in the selection step and each of the plurality of images other than the reference image captured in succession in the image-capturing step; and a generation step of generating a combined image by positionally aligning and then combining the reference image and those ones of the plurality of images whose amounts of positional deviation calculated in the calculation step are less than or equal to a predetermined amount of deviation. In this image combination program, it is preferred that, in the selection step, the reference image is selected so that the number of images for which the amount of positional deviation is less than or equal to the predetermined amount of deviation becomes large.

An image combination program according to a 14th aspect of the present invention for combining a plurality of images and for obtaining an image having an appropriate exposure determined according to a situation during image capture causes a computer to execute: an image-capturing step of acquiring images of a photographic subject captured in succession; a selection step of selecting, as a reference image, a single image from among a plurality of images that have been captured in succession in the image-capturing step; a calculation step of calculating an amount of positional deviation between the reference image selected in the selection step and each of the plurality of images other than the reference image captured in succession in the image-capturing step; a generation step of generating a combined image by positionally aligning and then combining the reference image and subject images that are ones of the plurality of images and whose amounts of positional deviation calculated in the calculation step are less than or equal to a predetermined amount of deviation; and a processing execution step of, if the image having the appropriate exposure cannot be obtained by combination of the reference image and the subject images, executing processing for exposure correction upon the combined image with varying the processing according to the total number of the reference image and the subject images combined in the generation step.

According to the present invention, it is possible to combine a plurality of images appropriately to generate a combined image.

DESCRIPTION OF THE PREFERRED EMBODIMENTS

—Embodiment One—

Figure 1:
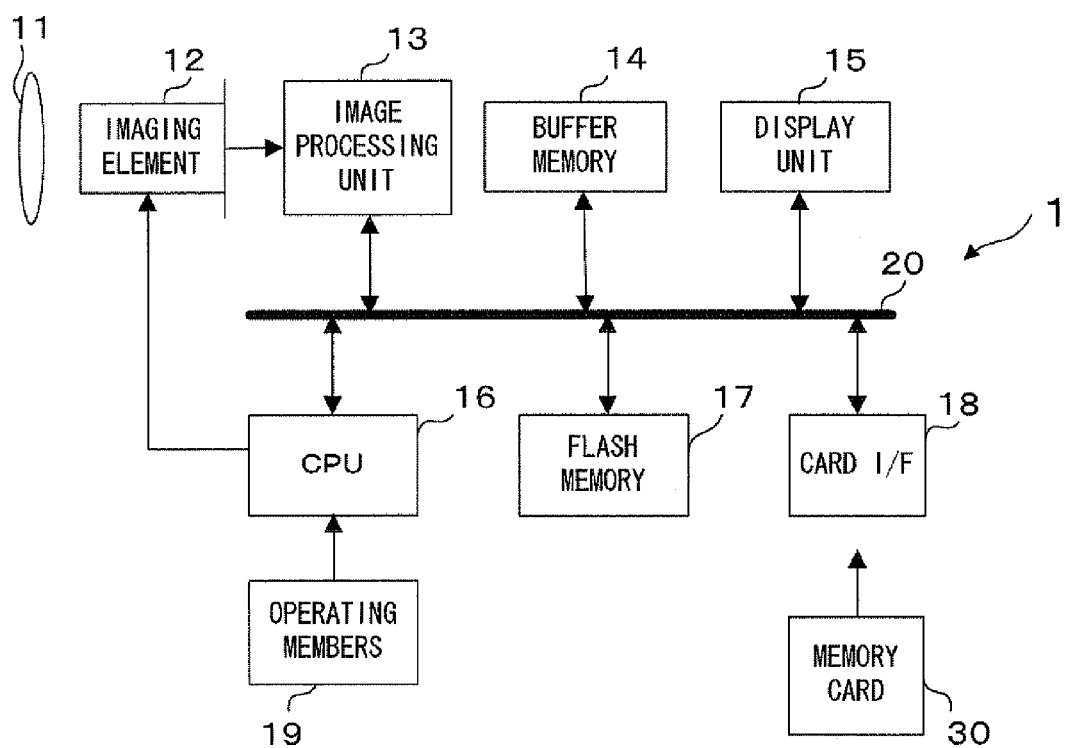
FIG. 1 is a block diagram showing the structure of a camera according to a first embodiment of the present invention.

FIG. 1 is a block diagram showing the structure of a camera according to the first embodiment of the present invention. In FIG. 1, this camera 1 includes a photographic optical system 11, an imaging element 12, an image processing unit 13, a buffer memory 14, a display unit 15, a CPU 16, a flash memory 17, a card interface (I/F) 18, and operating members 19.

The CPU 16, the flash memory 17, the card interface 18, the image processing unit 13, the buffer memory 14, and the display unit 15 are connected together via a bus 20.

The photographic optical system 11 includes a plurality of lenses that include a zoom lens and a focusing lens, and images an image of a photographic subject upon a light reception surface of the imaging element 12. It should be understood that in FIG. 1, for the sake of convenience, the photographic optical system 11 is shown as being a single lens.

The imaging element 12 is built from a CMOS image sensor or the like in which light reception elements are disposed in a two dimensional array upon a light reception surface. This imaging element 12 performs photoelectric conversion upon an image created by a ray bundle that has passed through the photographic optical system 11, so as to generate a digital image signal. This digital image signal is inputted to the image processing unit 13.

The image processing unit 13 performs various types of image processing upon the digital image data (such as color interpolation processing, tone conversion processing, contour enhancement processing, white balance adjustment processing, and so on). Moreover, in a hand-held night scene photographic mode that will be described hereinafter, it also performs image combination processing (position matching and addition).

The display unit 15 is built from a liquid crystal panel or the like, and displays images and operating menu screens and so on according to commands from the CPU 16. The buffer memory 14 temporarily stores digital image data before and after image processing by the image processing unit 13. And, as well as storing a program executed by the CPU 16, the flash memory 17 also stores table data that will be described hereinafter.

The CPU 16 controls the operations performed by the camera 1 by executing a program stored in the flash memory 17. This CPU 16 also performs control of AF (auto focus) operation and automatic exposure (AE) calculation. This AF operation may, for example, utilize a contrast detection method in which the focal position for the focusing lens (not shown in the figures) is obtained on the basis of the contrast information in the through image. This through image is an image for monitoring that, before shutter release operation, is acquired by the imaging element 12 repeatedly at predetermined intervals (for example at 60 frames per second).

The memory card interface 18 has a connector (not shown in the figure), and a storage medium such as a memory card or the like is connected to this connector. The memory card interface 18 performs writing of data to the storage medium 30 that is connected thereto, and reading of data from the storage medium 30. The storage medium 30 may be a memory card that includes an internal semiconductor memory, or a hard disk drive or the like.

The operating members 19 include a release button and a menu switch and so on. These operating members send operating signals to the CPU 16 corresponding to the various ways in which they may be operated, such as signals for photographic operation, for mode changeover, for menu selection, and so on.

The camera 1 of this embodiment can operate in a so-called hand-held night scene photographic mode. This photographic mode is a mode in which photography of a night scene is performed, not with the camera 1 being fixed upon a tripod, but instead casually with the camera 1 in a hand held state. Since this embodiment is distinguished by characteristic features of its photographic control during this hand-held night scene photographic mode, accordingly the following explanation will concentrate upon the processing during the hand-held night scene photographic mode.

Generally, since the photographic subject is dark during night scene photography, a long-duration exposure time is required. On the other hand, in the case of hand-held photography, there is a fear that shaking will be present in an image that is photographed with an exposure time longer than an exposure time limit Tlimit, this being the so called hand shake limit. If "f" (in mm) denotes the focal length of the photographic optical system 11, then (when converted to a 35 mm type camera system) this exposure time limit Tlimit may, for example, be taken as being 1/f (expressed in units of seconds).

Since a longer exposure time than the exposure time limit Tlimit is required during normal night scene photography, accordingly it is difficult to perform hand-held photography so that hand shaking does not occur. Thus, in the hand-held night scene photographic mode, a single image exposed at long duration is obtained by performing the main photographic operation while dividing it (by sequential shooting photography) into a plurality of successive exposures (supposed to be N in number), and by then adding together the N image signals that have been obtained by these N exposures by a per se known digital calculation technique. It should be understood that it may be arranged for the number of times N that photography is performed during this sequential shooting in the hand-held night scene photographic mode to be a fixed number that is set in advance, or to be a number that can be varied as desired by the user, or that can be varied by the CPU 16 according to the photographic conditions.

The CPU 16 determines the exposure time Tdiv for each shot that is photographed at this time by dividing the exposure time T that is required into equal parts, so that the result is shorter than the above described exposure time limit Tlimit, and moreover so that the number of times N for sequential shooting is a minimum. Here, the exposure time T is an exposure time that is determined by automatic exposure calculation (AE) so as to obtain an appropriate exposure. The CPU 16 may, for example, perform automatic exposure calculation (AE) on the basis of the brightness level of the image signal that forms the through image described above, thus determining the exposure time T on the basis of the average brightness of the through image. And the exposure time Tdiv and N are obtained for which T=N×Tdiv holds, with the exposure time for each shot Tdiv being shorter than Tlimit, and with the number of times N for sequential shooting being minimized.

The CPU 16 adds together the N images that have been photographed by these N sequential shots into which the overall photography has been separated, after having positionally aligned them together. For example, it may perform edge detection on the basis of the image signals included in predetermined regions (regions of approximately 60 pixels and including a common photographic subject) in each image, and may perform positional alignment so that the positions of the pixels that make up these edges match one another. By combining the plurality of images in this manner, it is possible for the camera 1 to obtain an image having an appropriate exposure as determined according to the circumstances during image capture, as described above.

However sometimes it is the case that, among the N images that have been shot by these N episodes of sequential shooting photography, one or more idiosyncratic images are photographed in which the amount of shaking is large as compared to the images before and after them. In this case, instead of each of these idiosyncratic images, the CPU 16 uses a duplicate of some other image among the N images that is not idiosyncratic. For example, the CPU 16 may take some one among the N images as being a reference image, and may specify, as being an idiosyncratic image, any image whose amount of positional deviation from that reference image is greater than a predetermined amount of deviation. The CPU 16 may select any desired image from among the N images that have been obtained by sequential shooting as the reference image, such as, for example, the image that was photographed first, an image that was photographed around halfway through, or the like. And, in the positional alignment and addition process, the CPU 16 excludes the specified idiosyncratic image from the subjects for addition, and uses an image that has been duplicated from some other image, for example a duplicate image of the reference image, instead of that idiosyncratic image.

Figure 2:
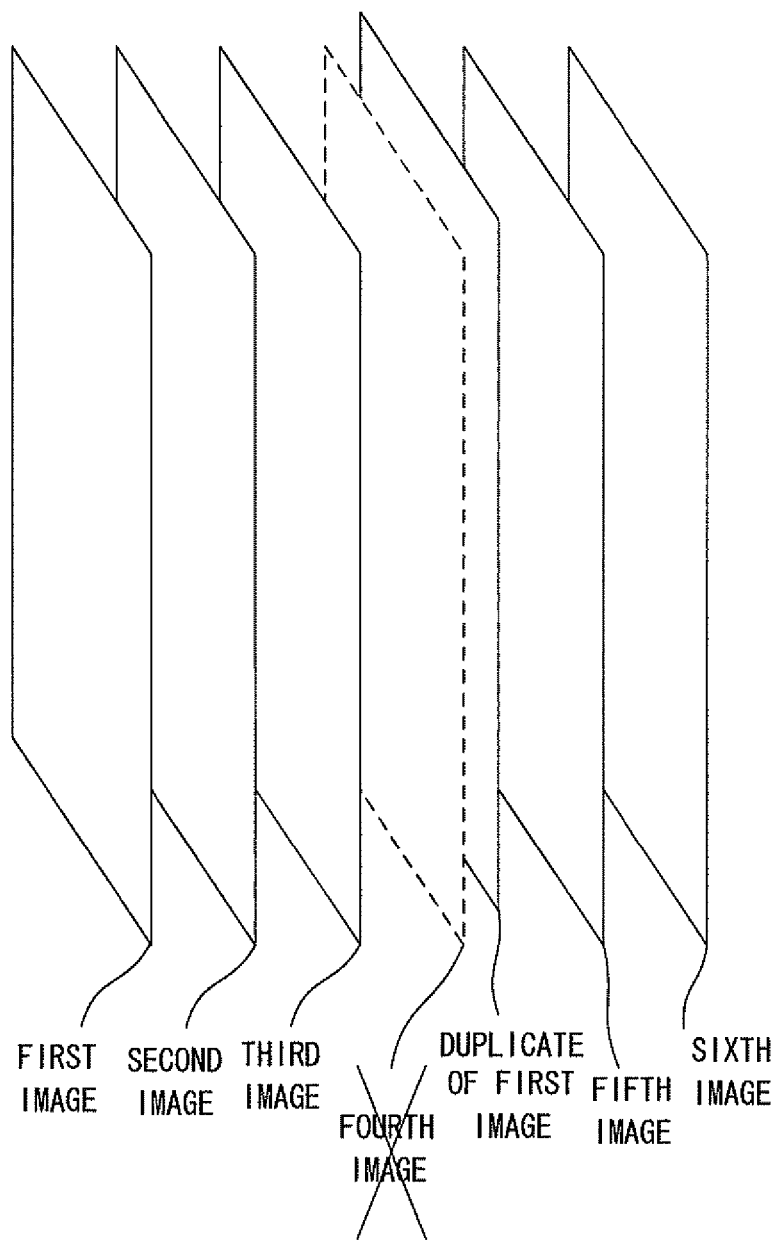
FIG. 2 is a figure showing an example of a case when six images have been shot by sequential shooting photography.

FIG. 2 is a figure showing an example when sequential shooting photography is divided into N=6 exposures. In FIG. 2, it is supposed that a relatively large amount of shaking is present in the fourth image. From among the first through third, the fifth, and the sixth images among the N=6 images that are not idiosyncratic, the CPU 16 duplicates the first image, for example, and substitutes this duplicated image for the fourth image, i.e. for the image that is idiosyncratic. Due to this, this first image that has been duplicated comes to be added in more times (in this example, twice) as compared with the other images that have been shot.

Generally random noise, i.e. so-called analog noise, is present in the images photographed by the camera 1. Since this noise changes from one moment to the next due to the fact that it is random noise, accordingly the noise that is included in each of the images shot during sequential shooting photography is in a different state because it is generated at a different moment. The influence of random noise tends to be reduced when images of a number of different shots are added together, since in general the random noise included in each of the shots tends to cancel out with the random noise included in some other shot or shots.

However when an image that has been duplicated from some other frame is substituted for an image in which shake is present, as described above, then it becomes difficult for the random noise that is included in this image used for duplication to mutually cancel out with the random noise in the images of the other frames, because the number of times that the image of the frame used for duplication is added into the total is greater as compared with the other frame images. In other words, a fear arises that the random noise that is included in this frame image used for duplication may easily stand out in the image after addition.

In this embodiment, in order to reduce the influence of this kind of random noise, the selection method for the reference image used for specifying the above described idiosyncratic images is contrived so as, to the greatest extent practicable, to prevent the same frame image from being added in a plurality of times. To put it in another manner, the CPU 16 contrives the method for selecting the reference image so that the number of images becomes great, for which the amount of positional deviation from the reference image is less than or equal to the predetermined amount of deviation. In other words, in this embodiment, it is arranged for the CPU 16 to select the reference image from among the N images that have been photographed, while excluding the image that was captured first and the image that was captured last. For example, if six images have been photographed as shown in FIG. 2, then the reference image is selected from among the images #2 through #5, thus excluding the images #1 and #6 as possible choices.

It should be understood that in order, to the greatest extent practicable, to prevent the same frame image from being added in a plurality of times, it is desirable to select, as the reference image, one single image that is positioned as close as possible to the center when the N images are arranged in time series. For example, if N is an odd number, then it is desirable to select, as the reference image, the single image that is positioned at the center when the N images are arranged in time series. Moreover, if N is an even number, then it is desirable to select, as the reference image, either one of the two images that are positioned at the center when the N images are arranged in time series. In the following, the reasons for this will be explained.

Figure 3:
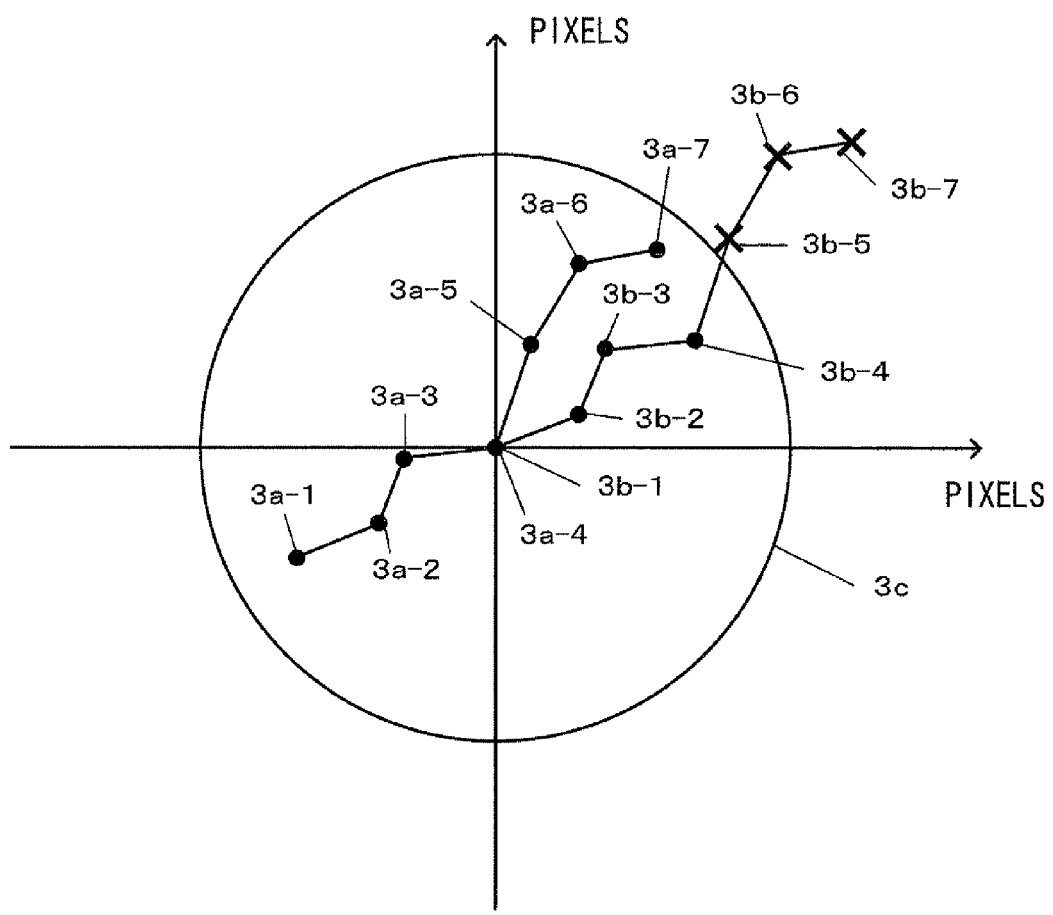
FIG. 3 is a figure showing how, when seven images have been photographed, their amounts of deviation may be laid out upon a two-dimensional coordinate system.

FIG. 3 is a figure relating to a case in which seven images have been shot, showing two modes in which the amounts of deviation of these seven images may be laid out upon a two-dimensional coordinate system. The merits that are obtained according to the reference image selection method of this first embodiment will now be explained using this figure. In FIG. 3, the amounts of deviation in the vertical direction (in pixels) from the reference image are shown along the vertical axis, while the amounts of deviation in the horizontal direction from the reference image are shown along the horizontal axis. Furthermore, the circle 3*c* shows the threshold value for deciding that an image is an idiosyncratic image: an image is determined to be an idiosyncratic image if its amount of deviation from the reference image is greater than this threshold value, in other words if it is an image for which the point representing its amount of deviation from the reference image lies outside the circle 3*c*.

In this FIG. 3, the amounts of deviation between the reference image and the other images when the seven images were photographed are shown by the points from the point 3*a*-1 to the point 3*a*-7, and alternatively by the points from the point 3*b*-1 to the point 3*b*-7. It should be understood that the points 3*a*-1 through 3*a*-7 show the amounts of deviation between the reference image and the other images with the fourth image taken as a reference, while the points 3*b*-1 through 3*b*-7 show the amounts of deviation between the reference image and the other images with the first image taken as a reference. In other words it will be understood that, for these seven images that have been photographed, in both cases, the amount of deviation increases in time series in a substantially constant direction (here, towards the upper right). For example, if the lens 11 is provided with a hand shaking correction mechanism of the lens shift type, then, after hand shaking correction has been applied, images that have been sequentially shot often exhibit this type of tendency for their amounts of deviation to increase in a substantially constant direction in time series.

First, an example of the determination of idiosyncratic images will be explained in the case that the first image has been selected as the reference image, as shown by the points 3*b*-1 through 3*b*-7. In this case, the point 3*b*-1 that shows the amount of deviation of the reference image is positioned at the origin, since the amount of deviation of the reference image is naturally zero. And the amounts of deviation from this reference image increase in a substantially constant direction, so that the point 3*b*-2 shows the amount of deviation of the second image, the point 3*b*-3 shows the amount of deviation of the third image, the point 3*b*-4 shows the amount of deviation of the fourth image, the point 3*b*-5 shows the amount of deviation of the fifth image, the point 3*b*-6 shows the amount of deviation of the sixth image, and the point 3*b*-7 shows the amount of deviation of the seventh image.

In this case, as described above, images for which it is determined that the amount of deviation from the reference image is greater than the threshold value, in other words images whose corresponding points showing their amounts of deviation from the reference image are positioned outside the circle 3*c*, are determined as being idiosyncratic images. Here, since the point 3*b*-5, the point 3*b*-6, and the point 3*b*-7 are positioned outside the circle 3*c*, it is determined that the fifth image, the sixth image, and the seventh image are idiosyncratic images. If the amounts of deviation of the images that have been photographed increase in a substantially constant direction in time series in this manner, then, when the first image is selected as the reference image, it is relatively more likely that it will be determined that some of the later images are idiosyncratic images, since the amounts of deviation from this reference image of the images that were photographed after this reference image become progressively larger. Due to this, the possibility becomes high that the random noise will increase as described above, since the possibility becomes higher that it will be necessary to substitute duplicates of one or more other images for one or more idiosyncratic images. The same holds, mutatis mutandis, for the case in which the image that was photographed last is selected as the reference image.

Next, an example of the determination of idiosyncratic images will be explained, in the case that the fourth image has been selected as the reference image as shown by the points 3a-1 through 3a-7. In this case, the point 3a-4 that shows the amount of deviation of the reference image is positioned at the origin, since the amount of deviation of the reference image is naturally zero. And the point 3a-1 that shows the amount of deviation of the first image, the point 3a-2 that shows the amount of deviation of the second image, the point 3a-3 that shows the amount of deviation of the third image, the point 3a-5 that shows the amount of deviation of the fifth image, the point 3a-6 that shows the amount of deviation of the sixth image, and the point 3a-7 that shows the amount of deviation of the seventh image progress in a substantially constant direction, with this series being centered around the point 3a-4 that is positioned at the origin.

In this case no images are determined to be idiosyncratic images, since all of the points that show the amounts of deviation of the images from the reference image fall within the circle 3c. Due to this, the CPU 16 is able to add together all of the seven images after positionally matching them together. If the amounts of deviation of the photographed images increase in a constant direction in time series in this manner, then, if the image that was photographed at the center of an arrangement of the seven images in time series (here, the fourth image) is selected as the reference image, it is relatively less likely that it will be determined that the other images are idiosyncratic images, since the amounts of deviation from this reference image of the images that were photographed before and after this reference image will become small. Due to this, it is possible to suppress increase of the random noise, since the possibility becomes lower that it will be necessary to substitute duplicates of one or more other images for one or more idiosyncratic images.

Figure 4:
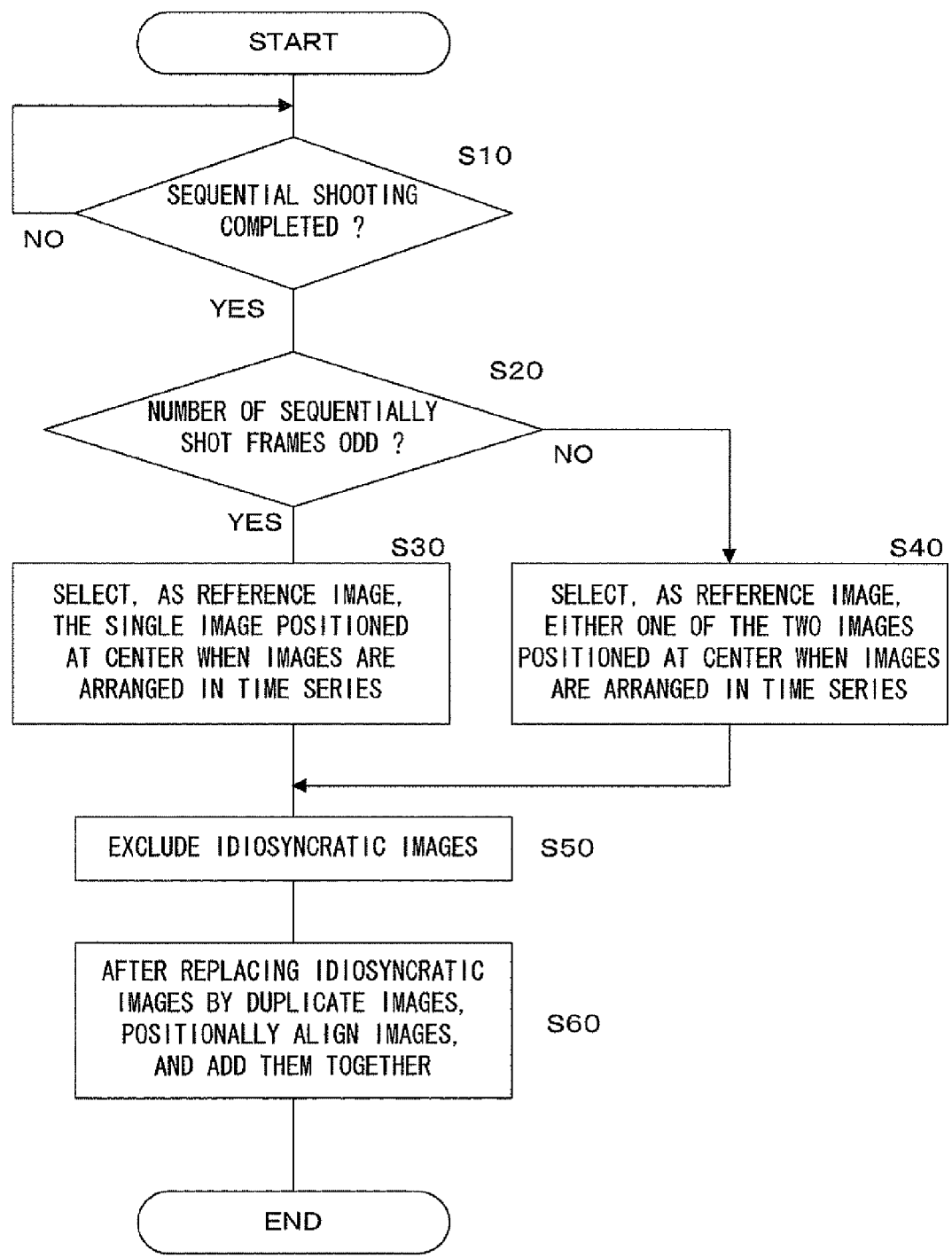
FIG. 4 is a flow chart showing a flow of processing for selection of a reference image, in the first embodiment.

FIG. 4 is a flow chart showing the flow of processing for selection of the reference image in this first embodiment. The processing shown in this figure is executed by the CPU 16 as a program that starts when a plurality of images have been shot by sequential shooting photography during the hand-held night scene photographic mode.

In a step S10, the CPU 16 makes a decision as to whether or not sequential shooting has been completed. If an affirmative decision is reached in this step S10, then the flow of control proceeds to a step S20. In this step S20, the CPU 16 determines whether or not the number of images that has been obtained by sequential shooting is an odd number.

If an affirmative decision has been reached in the step S20, then the flow of control proceeds to a step S30, in which the CPU 16 selects, as the reference image, the single image that is positioned at the center of the plurality of images that have been obtained by sequential shooting when they are arranged in time series. Then the flow of control is transferred to a step S50. On the other hand, if a negative decision has been reached in the step S20, then the flow of control is transferred to a step S40, in which the CPU 16 selects, as the reference image, either of the two images that are positioned at the center of the plurality of images that have been obtained by sequential shooting when they are arranged in time series. Then the flow of control is transferred to the step S50.

In this step S50, as described above, the CPU 16 specifies, as being an idiosyncratic image, any image or images whose amount of positional deviation from the reference image is greater than some predetermined amount of deviation, and excludes any such specified idiosyncratic image or images from the subjects for combination. Then the flow of control proceeds to a step S60, in which the CPU 16 replaces the excluded idiosyncratic images by duplicates of other ones of the images that have been sequentially shot, positionally aligns this modified set of images, and then adds them together. Then this processing terminates.

According to the first embodiment as explained above, the following advantageous effects can be obtained.

(1) It is arranged for the CPU 16 to select the reference image so that the number of images whose amount of positional deviation is less than or equal to the predetermined amount of deviation becomes great, and to mutually adjust the positions of the images and to add them together while taking this reference image as a standard. In concrete terms, it is arranged for the CPU 16 to select the reference image from among the N images that have been shot, while excluding from this selection the image that was shot first and the image that was shot last. By doing this, it is possible to reduce the influence of random noise in the combined image by, as much as possible, avoiding the same frame image being added in a plurality of times.

(2) If the number of images that have been shot by sequential shooting is an odd number, then it is arranged for the CPU 16 to select, as the reference image, the single image that is positioned at the center of the plurality of images when they are arranged in time series; while, if the number of images that have been shot by sequential shooting is an even number, then it is arranged for the CPU 16 to select, as the reference image, either one of the two images that are positioned at the center of the plurality of images when they are arranged in time series. Due to this, if the amounts of deviation increase in some substantially constant direction in time series, then it is possible to select the reference image so that the number of images whose amounts of positional deviation from the reference image are less than or equal to the predetermined amount of deviation becomes great.

—Embodiment Two—

In the first embodiment described above an example was explained in which, in order for the number of images for which the amount of positional deviation from the reference image was less than the predetermined amount of deviation to become large, the CPU 16 selected, as the reference image, a single image that was positioned as close as possible to the center of an arrangement in time series of the N images. By contrast, in the second embodiment, from among the images obtained by sequential shooting, the CPU 16 selects, as the reference image, the image whose maximum amount of positional deviation from the other images is the smallest. It should be understood that, in the description of this second embodiment, explanation of FIGS. 1 and 2 is omitted, since this portion is the same as in the case of the first embodiment.

In the following, this method for selecting the reference image in the second embodiment will be explained. If for example six images have been photographed by sequential shooting, then the CPU 16 takes the first image as a candidate image and calculates the amounts of positional deviation between this candidate image and each of the second through the sixth images. Then the CPU 16 specifies, from among these images, the combination (the "first combination") of two images, including this candidate image, for which the amount of positional deviation is the greatest. Next the second image is taken as a candidate image, the amounts of positional deviation between this candidate image and each of the third through the sixth images are calculated, and, from among these images, the combination (the "second combination") of two images, including this candidate image, for which the amount of positional deviation is the greatest is specified.

Then the third image is taken as a candidate image, the amounts of positional deviation between this candidate image and each of the fourth through the sixth images are calculated, and, from among these images, the combination (the "third combination") of two images, including this candidate image, for which the amount of positional deviation is the greatest is specified. And next the fourth image is taken as a candidate image, the amounts of positional deviation between this candidate image and each of the fifth and the sixth images are calculated, and, from among these images, the combination (the "fourth combination") of two images, including this candidate image, for which the amount of positional deviation is the greatest is specified. Finally, the fifth image is taken as a candidate image, the amount of positional deviation between this candidate image and the fifth image is calculated, and this is specified as the combination (the "fifth combination") of two images, including this candidate image, for which the amount of positional deviation is the greatest.

And the CPU 16 specifies, from among the first combination through the fifth combination, that combination for which the amount of positional deviation between its two images is the smallest, and selects the candidate image of that specified combination as the reference image. For example, if the combination for which the amount of positional deviation between its two images is the smallest is the third combination (for example, the combination of the third image and the sixth image), then the third image, i.e. the candidate image of this third combination, is selected as the reference image. Since, by doing this, it is possible to select, as the reference image, that image for which the maximum amount of positional deviation from other images becomes the smallest. Accordingly, the number of images for which the positional amount of deviation from the reference image is less than or equal to the predetermined amount of deviation is made to be large, so that it is possible to prevent the same frame image from being added into the total a plurality of times, to the greatest extent practicable.

Figure 5:
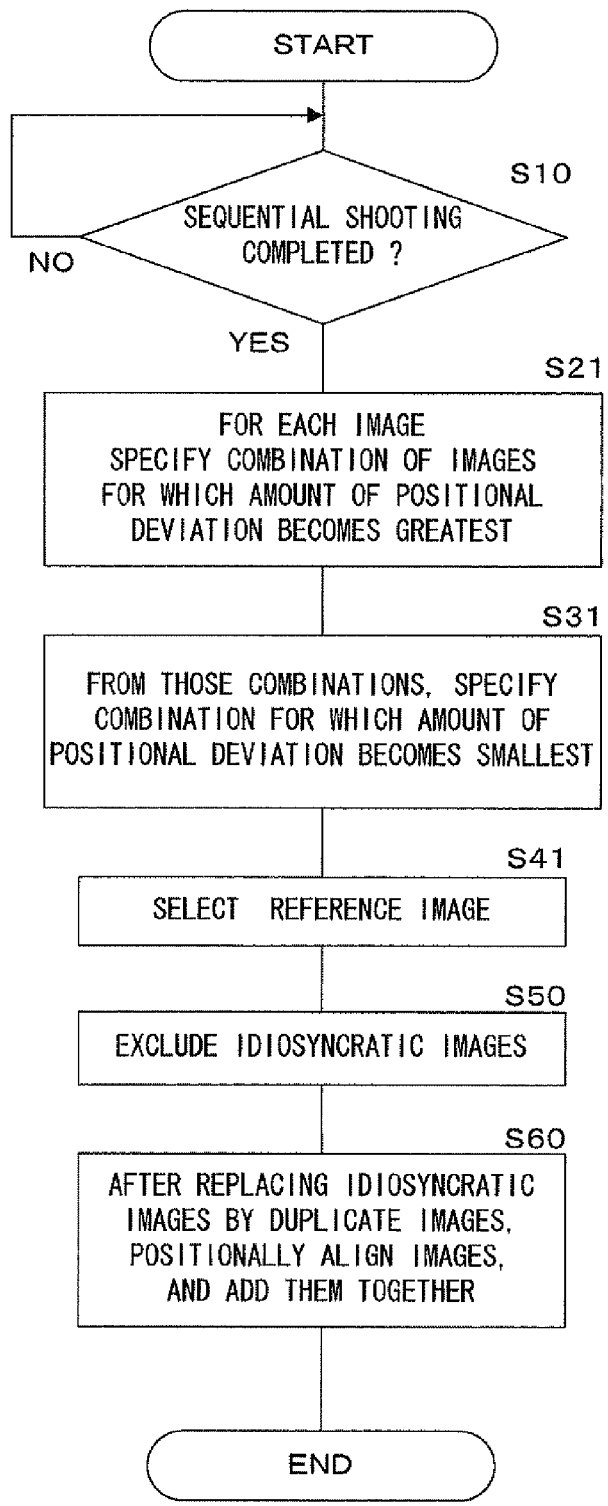
FIG. 5 is a flow chart showing a flow of processing for selection of a reference image, in a second embodiment.

FIG. 5 is a flow chart showing the flow of processing for selecting the reference image, in this second embodiment. The processing shown in this figure is executed by the CPU 16 as a program that starts when a plurality of images have been shot by sequential shooting photography during the hand-held night scene photographic mode. It should be understood that in FIG. 5, to steps similar to ones in FIG. 4 the same step numbers as those in FIG. 4 are appended, and the explanation will focus upon the points of difference.

In a step S21, as described above, the CPU 16 sets each of the images as a candidate image and specifies the combination of two images for which the positional deviation of that candidate image from the other image becomes the greatest respectively. Then the flow of control is transferred to a step S31, in which the CPU 16 specifies, from among the first combination through the fifth combination, that combination for which the amount of positional deviation between its two images is the smallest. Then the flow of control proceeds to a step S41. In this step S41, the CPU 16 selects the candidate image of the combination that was specified in the step S31 as the reference image. Then the flow of control proceeds to the step S50.

According to the second embodiment as explained above, in addition to the advantageous effects obtained by the first embodiment described above, it is also possible to obtain the following advantageous effects. That is, it is arranged for the CPU 16 to select, from among the plurality of images that have been obtained by sequential shooting, the image for which the maximum amount of positional deviation from other images is the smallest as the reference image. Due to this, it is possible to prevent, to the greatest extent practicable, the same frame image from being added into the total a plurality of times, so that it is possible to reduce the influence of random noise in the combined image.

—Embodiment Three—

With the first and second embodiments described above, as methods for reducing the influence of random noise, examples have been explained in which methods are contemplated for selecting the reference image so that the number of images for which the amount of positional deviation from the reference image is less than some predetermined amount of deviation becomes great. By contrast, in this third embodiment, as a method for reducing the influence of random noise, the images (with any idiosyncratic images excluded) are added together while performing position matching by using the above described reference image as a position matching reference. In other words, a combined image is generated by combining together the reference image and those images whose amounts of positional deviation with respect to the reference image are less than or equal to some predetermined amount of positional deviation, after having performed position matching on those images. Thereafter, in order to reduce the random noise, processing for exposure correction is performed upon the combined image after the above addition. It should be understood that in the description of this third embodiment explanation of FIGS. 1 and 2 is omitted, since this portion is similar to the cases of the first and second embodiments.

In the following, this exposure correction processing of the third embodiment will be explained. In this third embodiment, the following methods (A) and (B) are used as exposure correction processing for reducing the influence of random noise.

(A) Application of Digital Gain

In this embodiment, as a first method for reduction of the influence of random noise, a method is adopted of applying digital gain to the combined image after addition, corresponding to the number of images that were added together. In other words, the CPU 16 applies digital gain to the combined image that has been obtained by additive combination (excluding any idiosyncratic images), so that the exposure of this combined image, and the exposure of the image if it had been obtained by additive combination with the idiosyncratic image or images not being excluded, agree with one another. For example, if six images have been photographed by sequential shooting, but among these, the second image, the third image, the fourth image, and the sixth image (i.e. four images) are idiosyncratic images, and the only images that can be combined by addition are the first image and the fifth image, then, after having combined the first image and the fifth image by addition, a digital gain of 3X is applied to the resulting combined image. Since, by performing processing in this manner, the same image (for example the reference image) is not added into the total a plurality of times, accordingly it is possible to decrease the amount of random noise in the resulting image after additive combination. In this case none of the images that have been shot is duplicated as a preliminary to the addition process.

(B) Pixel Shift Combination

In this embodiment, as a second method in order to reduce the influence of random noise, the combined image after addition is duplicated a certain number of times corresponding to the number of the images that were added together. And the various combined images that have thus been duplicated are added together while shifting these combined images by one pixel along one of the directions in which the pixels that make up these combined images are arranged, i.e. in any one of the upwards, downwards, leftwards, and rightwards directions. This additive combination of the plurality of combined images while shifting them in various directions by one pixel in this embodiment is termed "pixel shift combination". For example, suppose that six images have been photographed by sequential shooting, and suppose that, of these, the second image, the third image, the fourth image, and the sixth image are idiosyncratic images, with only the first image and the fifth image being images that are suitable for being combined by addition. In this case, three duplicate copies of the combined image that has been obtained by additive combination of the first image and the fifth image are prepared, and the first combined image copy and the second combined image copy are pixel shift combined while being relatively shifted by one pixel in one of the directions upwards, downwards, leftwards, and rightwards. And then this combined image that has been obtained by pixel shift combination and the third combined image copy are pixel shift combined while being relatively shifted by one pixel in one of the directions upwards, downwards, leftwards, and rightwards. At this time, the directions of shifting by one pixel are different for this first episode of pixel shift combination and for this second episode of pixel shift combination. By performing processing in this manner, it is possible to decrease the amount of random noise in the image after addition, since the same image is not directly added into the total a plurality of times, but rather is shifted somewhat.

In case of the first method described above in which digital gain is applied to the combined image, if the number of images that can be combined by addition is reduced, and, due to this, if the amount of digital gain which is applied to the combined image is enlarged, then the amount of noise generated due to application of digital gain becomes great, and this is undesirable. Due to this, if the amount of digital gain needed to be applied to the combined image is less than a predetermined gain amount, for example 2X, then the CPU 16 executes the processing described above as the first method; while, if the amount of digital gain needed to be applied to the combined image is greater than or equal to the predetermined gain amount, then the CPU 16 executes the processing described above as the second method. By doing this, the processing for exposure correction that is performed upon the combined image is varied according to the total number of reference images that are combined when creating the combined image and images for which the amount of positional deviation from this reference image is less than the predetermined amount of deviation. Due to this, while the amount of digital gain applied to the combined image becomes greater, it is still possible to prevent the amount of noise created by application of digital gain becoming undesirably greater.

Figure 6:
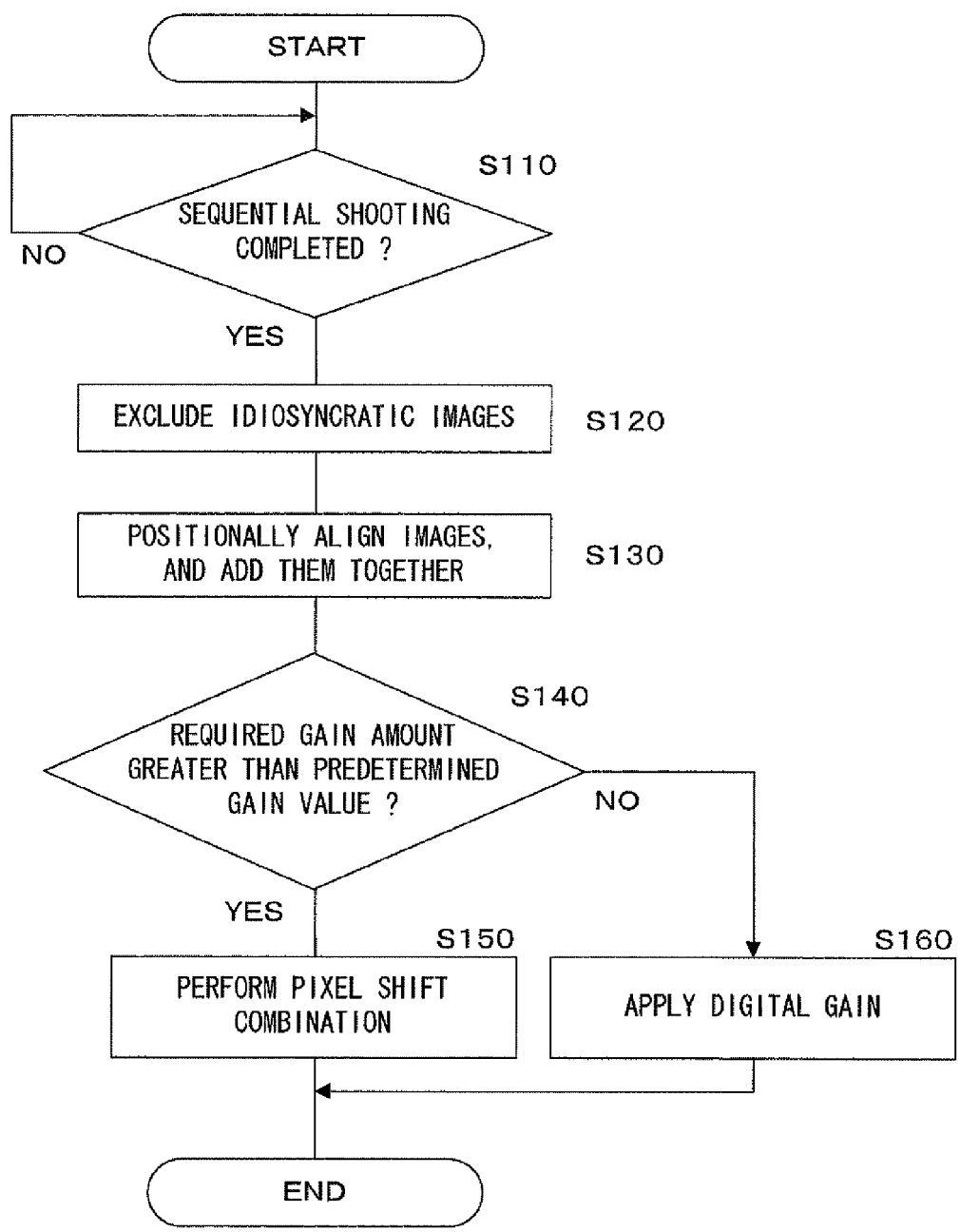
FIG. 6 is a flow chart showing a flow of image combination processing in a third embodiment during the hand-held night scene photographic mode.

FIG. 6 is a flow chart showing the flow of processing for image combination during the hand-held night scene photographic mode, in this third embodiment. The processing shown in this figure is executed by the CPU 16 as a program that starts when a plurality of images have been shot by sequential shooting photography during the hand-held night scene photographic mode.

In a step S110, the CPU 16 makes a decision as to whether or not sequential shooting has been completed. If the result of the decision in the step S110 is affirmative, then the flow of control proceeds to a step S120. In this step S120, as described above, the CPU 16 takes some one image among the N images that have been obtained by sequential shooting, for example the image that was photographed first, as the reference image, and specifies any image for which the amount of positional deviation from the reference image is greater than a predetermined amount of deviation as being an idiosyncratic image. And the CPU 16 excludes any idiosyncratic images that have been specified from the subjects for addition. Then the flow of control proceeds to a step S130, in which the CPU 16 adds the set of images from which the idiosyncratic images specified in the step S120 have been excluded together after having positionally matched them. Then the flow of control proceeds to a step S140.

In this step S140, the CPU 16 makes a decision as to whether or not the amount of gain which would be required in order to make the exposure of the combined image obtained by additive combination of the images with the exception of any idiosyncratic images, and the exposure of the combined image if the idiosyncratic images were not excluded, agree with one another, is greater than or equal to some predetermined gain value, for example 2X. If the result of this decision in the step S140 is affirmative, then the flow of control proceeds to a step S150. And in this step S150, the CPU 16 performs pixel shift combination as described above upon the combined image that has been obtained by additive combination, and then processing terminates.

On the other hand, if the result of the decision in the step S140 is negative, then the flow of control is transferred to a step S160. In this step S160 the CPU 16 applies digital gain as described above to the combined image that was obtained in the step S130 by additive combination, and then this processing terminates.

According to this third embodiment as explained above, the following advantageous effects can be obtained.

(1) It is arranged for the CPU 16 to apply digital gain so as to make the exposure of the combined image that is obtained by additive combination of the images with any idiosyncratic images excluded and the exposure of the image if additive combination is performed with the idiosyncratic images not being excluded agree with one another. By doing this it is possible to decrease the amount of random noise in the image after addition, while preventing the same image being added into the total a plurality of times.

(2) It is arranged for the CPU 16 to duplicate the combined image, which is obtained by additive combination of the images with any idiosyncratic images excluded, by a number of times corresponding to the number of images that were added together for the combined image, so as to make the exposure of the combined image and the exposure of the image if additive combination is performed with the idiosyncratic images not being excluded agree with one another, and then to add the duplicated combined images together while mutually shifting them either upwards, downwards, leftwards, or rightwards, i.e. in one of the directions in which the pixels that make up the combined images are arranged, by one pixel. By doing this it is possible to decrease the amount of random noise in the image after addition, while preventing the same image being added into the total a plurality of times.

(3) It is arranged for the CPU 16 to apply digital gain to the combined image if the amount of digital gain which is required to be applied to the combined image is less than some predetermined gain amount, for example 2X, while performing pixel shift combination if this required amount of gain is greater than or equal to the predetermined gain amount. By doing this, it is possible to prevent the amount of noise generated by applying digital gain to the combined image from becoming undesirably great, due to the amount of digital gain becoming too large.

—Variant Embodiments—

It should be understood that the cameras of the embodiments described above may also be varied in the following ways.

(1) In the first embodiment described above, if the number of images photographed by sequential shooting was even, it was arranged for the CPU 16 to select, as the reference image, either of the two images positioned at the center when the plurality of images were arranged in time series. However, at this time, it would also be acceptable to arrange for the CPU 16 to select as the reference image, the one of those two images that was captured later. The reason for this is that image shaking generated due to depression of the release button by the user generally tends to be greater directly after the release button has been depressed and to diminish along with the passage of time, and accordingly, by taking as the reference image that one of the two images for which the time interval that has elapsed from the depression of the release button is the longer, that image can be selected as the reference image, whose amount of image shaking is probably the smaller.

(2) In the second embodiment described above, an example was explained in which the CPU 16 specified, from among the first combination through the fifth combination, that combination for which the amount of positional deviation between its two images was the least, and then selected, as the reference image, the candidate image from the selected combination. However, it would also be acceptable to arrange for the CPU 16 to determine whether or not image shaking is present in the candidate image in the combination for which the amount of positional deviation between its two images is the least, and, if image shaking is present, to specify, from among the first combination through the fifth combination, that combination for which the amount of positional deviation between its two images is the second least, and to select, as the reference image, the candidate image of that specified combination. By doing this, it is possible to prevent an image in which image shaking is present from being selected as the reference image.

It should be understood that it would also be acceptable, if image shaking is also present in the candidate image of the combination for which the amount of positional deviation between its two images is the second least, to arrange for the CPU 16 to select, as the reference image, the candidate image of the combination for which the amount of positional deviation between its two images is the third least. Furthermore, in the first embodiment as well, in a similar manner, if image shaking is present in the reference image that has been selected, it would also be acceptable to arrange for the CPU 16 to select, as the reference image, the image that was photographed before or after that reference image (but excluding the image that was first captured during sequential shooting, and the image that was captured last). It should be understood that description of the method for determining whether or not image shaking is present in the image is omitted here, since it may be per se conventional.

(3) If, in the third embodiment described above, the required amount of digital gain for the combined image is less than the predetermined gain amount, for example 2X, then it is arranged for the CPU 16 to apply digital gain to the combined image, while, if the required amount of digital gain for the combined image is greater than or equal to the predetermined gain amount, then it is arranged for the CPU 16 to perform pixel shift combination. However, it would also be acceptable to arrange for the CPU 16 to apply digital gain to the combined image, irrespective of the magnitude of the amount of gain required, in order to prevent the occurrence of random noise. Or, alternatively, it would also be acceptable to arrange for the CPU 16 to perform pixel shift combination upon the combined image, irrespective of the magnitude of the amount of gain required, in order to prevent the occurrence of random noise.

(4) Moreover, in the third embodiment described above, as described above, it was arranged to determine which of the first and the second method should be employed according to the amount of digital gain which is required, as determined in correspondence to the number of images that are to be used for generating the combined image. However, it would also be acceptable to arrange to determine which of the first and the second method should be employed, not according to the amount of gain required, but according to the number of images that are to be used for creating the combined image, in other words, according to the total number of the reference image and the images for which the amounts of positional deviation from the reference image are less than or equal to the predetermined amount of deviation. For example, if the number of images that are to be used for creating the combined image is less than a predetermined number, then the second method described above according to which pixel shift combination is performed may be employed; while, if the number of images that are to be used for creating the combined image is greater than or equal to that predetermined number, then the first method described above according to which digital gain is applied to the combined image may be employed.

(5) Moreover, in the third embodiment described above, it would also be acceptable to arrange for the CPU 16 to perform both types of processing, i.e. including both pixel shift combination processing and digital gain application processing. For example, if the above described required amount of gain is 4X, then it would be possible to perform pixel shift combination of the two combined images, and then subsequently to apply a digital gain of 2X to the resultant image that has been obtained in this manner.

(6) In the third embodiment described above an example was explained in which, in the process of pixel shift combination, the CPU 16 added together the duplicated combined images while shifting each of them in one of the directions that the pixels constituting these combined images were arranged, i.e. in one of the directions upwards, downwards, leftwards, and rightwards. However, if there are a plurality of combined images that are to be subjects of addition, then it would be possible to reduce the influence of random noise to a greater extent than if all of the combined images are added together just as they are, provided that at least one of the combined images is shifted by one pixel relative to the others.

Figure 7:
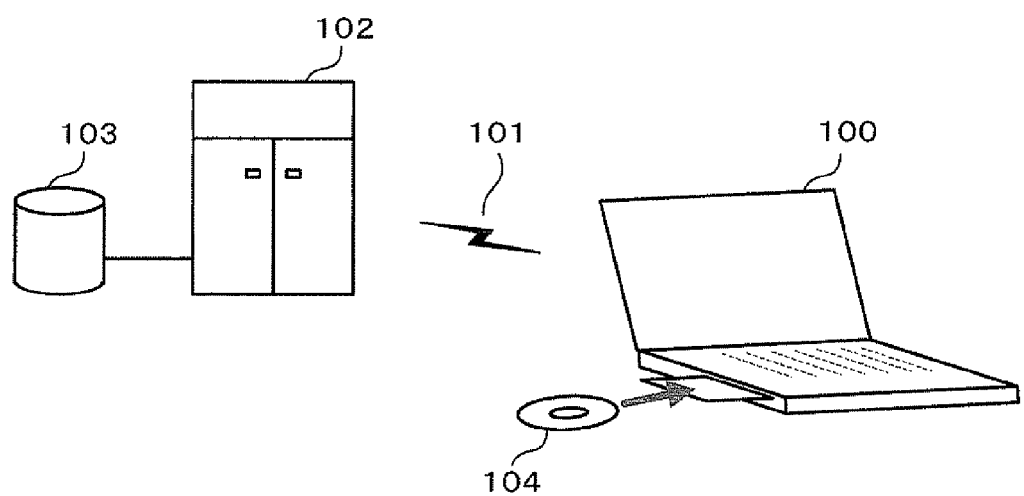
FIG. 7 is a figure showing an example of a computer device.

(7) With the first, second, and third embodiments described above, the present invention was explained in terms of examples of application to a camera. However, it would also be acceptable to arrange to provide a night scene image combination processing device by executing an image combination program that performs the processing shown in FIG. 4, FIG. 5, or FIG. 6 upon the computer device 100 shown in FIG. 7. If the image combination program is to be used after having been read into the personal computer 100, then the personal computer 100 may be used as an image combination processing device by executing this program, after the program has been loaded into a data storage device of the personal computer 100. In this case the N sequentially photographed images that have been obtained by sequential shooting are temporarily stored in a working memory of the computer device 100 (not shown in the figure).

The loading of the program onto the personal computer 100 may be performed by setting a non-transitory recording medium 104 such as a CD-ROM or the like, upon which the program is stored, into the personal computer; or it would also be acceptable to arrange to load the program onto the personal computer 100 by a method of transmitting it via a communication circuit 101 such as a network or the like. If this latter method of transmission via a communication circuit 101 is employed, then the program is stored upon a hard disk device 103 or the like of a server (i.e. a computer) 102 that is connected to the communication circuit 101. Thus, this image combination program may be supplied as a computer program product in various formats, for example as a recording upon the recording medium 104, by supply via the communication circuit 101, or the like.

It should be understood that the present invention is not to be considered as being limited in any way by the structures of the embodiments described above, provided that its characteristic functions are adhered to. Moreover, it would also be acceptable to arrange to combine any two or more of the embodiments and variant embodiments described above.

What is claimed is:

1. An image-capturing device, comprising:
   an image-capturing unit that acquires a plurality of captured-image by capturing an image of a photographic subject;
   a selection unit that selects, as a reference captured-image, an image from among the plurality of captured-images that have been captured by the image-capturing unit;
   a calculation unit that calculates an amount of relative positional deviation of pixels between the reference captured-image selected by the selection unit and each of the plurality of captured-images which are different from the reference captured-image; and
   a generation unit that generates a combined image by using the captured-images whose amounts of relative positional deviation of pixels calculated by the calculation unit are less than or equal to a predetermined amount of deviation of pixels that is related to exposure time, and without using the images whose amounts of relative positional deviation of pixels calculated by the calculation unit are greater than the predetermined amount of deviation of pixels that is related to exposure time, among the plurality of the captured images, wherein
   if a number of the captured-images whose amounts of relative positional deviation of pixels from a first captured-image are less than or equal to a predetermined amount of deviation of pixels that is related to exposure time is greater than a number of the captured-images whose amounts of relative positional deviation of pixels from a second captured-image are less than or equal to a predetermined amount of deviation of pixels that is related to exposure time, the selection unit selects the first captured-image as the reference captured-image.

2. An image capturing device according to claim 1, wherein
   the selection unit compares a number of the captured-images whose amounts of relative positional deviation are less than or equal to the predetermined amount of deviation when the first-captured image is selected as the reference image, with a number of the captured-images whose amounts of relative positional deviation are less than or equal to the predetermined amount of deviation when the second captured-image is selected as the reference image, and selects the first captured-image as the reference image if the number when the first captured-image is selected is greater than the number when the second captured-image is selected.

3. An image capturing device according to claim 1, wherein
   the selection unit selects the reference image so that the number of images for which the amount of relative positional deviation is less than or equal to the predetermined amount of deviation becomes the largest.

4. An image-capturing device according to claim 1, wherein
   the selection unit selects the reference image from among the plurality of images captured by the image-capturing unit, after having excluded the image that was captured first and the image that was captured last from the plurality of images.

5. An image-capturing device according to claim 1, wherein
   from among the plurality of images captured by the image-capturing unit, the selection unit selects as the reference image, an image whose maximum amount of relative positional deviation from other images is the smallest.

6. An image-capturing device according to claim 1, wherein
   the images that are captured by the image-capturing unit are images upon which hand shaking correction has been performed.

7. An image-capturing device according to claim 1, further comprising:
   a processing adjusting unit that, if an image having an appropriate exposure cannot be obtained by combination of the reference image and the images whose amounts of relative positional deviation are less than or equal to a predetermined amount of deviation, adjusts processing for exposure correction upon the combined image in accordance with the number of images whose relative positional deviation is less than or equal to the predetermined amount of deviation.

8. A non-transitory computer readable medium embodying an image combination program that, when executed on a computer, causes the computer to execute a method, the method comprising:
   an image-capturing step of acquiring images of a photographic subject;
   a selection step of selecting, as a reference image, an image from among a plurality of images that have been captured in the image-capturing step;
   a calculation step of calculating an amount of relative positional deviation of pixels between the reference image selected in the selection step and each of the plurality of images other than the reference image captured in the image-capturing step; and a generation step of generating a combined image by using the images whose amounts of relative positional deviation of pixels calculated in the calculation step are less than or equal to a predetermined amount of deviation of pixels that is related to exposure time, and without using the images whose amounts of relative positional deviation of pixels calculated in the calculation step are greater than the predetermined amount of deviation of pixels that is related to exposure time, among the plurality of the captured-images, wherein if a number of the images whose amounts of relative positional deviation of pixels from a first image are less than or equal to a predetermined amount of deviation of pixels that is related to exposure time is greater than a number of the images whose amounts of relative positional deviation of pixels from a second image are less than or equal to a predetermined amount of deviation of pixels that is related to exposure time, the first image is selected as the reference image in the selection step.

9. A non-transitory computer readable medium embodying an image combination program that, when executed on a computer, causes the computer to execute the method according to claim 8, the method further comprising:

a processing adjusting step of adjusting processing for exposure correction, wherein if the image having the appropriate exposure cannot be obtained by combination of the reference image and the images whose amounts of relative positional deviation are less than or equal to a predetermined amount of deviation, processing for exposure correction upon the combined image is adjusted in accordance with the number of images whose relative positional deviation is less than or equal to the predetermined amount of deviation, in the processing adjusting step.

10. An image-capturing device according to claim 1, wherein each relative positional deviation of one image relative to another means how much each respective image has moved relative to each other measured in pixels.

* * * * *